US009916761B2

(12) United States Patent
Smith et al.

(10) Patent No.: US 9,916,761 B2
(45) Date of Patent: *Mar. 13, 2018

(54) METHOD AND SYSTEM FOR LOCATING A MOBILE ASSET

(71) Applicant: Digital Recognition Network, Inc., Fort Worth, TX (US)

(72) Inventors: Shawn Smith, Palo Alto, CA (US); Cort DeHart, Crowley, TX (US)

(73) Assignee: Digital Recognition Network, Inc., Fort Worth, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/162,250

(22) Filed: May 23, 2016

(65) Prior Publication Data
US 2016/0267793 A1 Sep. 15, 2016

Related U.S. Application Data

(63) Continuation of application No. 13/412,379, filed on Mar. 5, 2012, now Pat. No. 9,373,142.
(Continued)

(51) Int. Cl.
*G08G 1/123* (2006.01)
*G08G 1/127* (2006.01)
(Continued)

(52) U.S. Cl.
CPC .............. *G08G 1/127* (2013.01); *G01S 1/045* (2013.01); *G06F 17/3087* (2013.01);
(Continued)

(58) Field of Classification Search
CPC ........ G06Q 50/30; G06Q 10/00; G06Q 10/02; G06Q 10/025; G06Q 50/265; G06Q 10/0637; G06Q 20/12; G06Q 20/204; G06Q 20/40; G06Q 30/02; G06Q 30/06; G06Q 30/0601; G06Q 40/12; G06Q 50/24; G06Q 10/083
(Continued)

(56) References Cited

U.S. PATENT DOCUMENTS 3,656,111 A   4/1972   Royster, Sr.
4,603,390 A   7/1986   Mehdipour et al.
(Continued)

OTHER PUBLICATIONS

"CCTV Network Tracks 'Getaway' Car", BBC News, Nov. 21, 2005.
(Continued)

*Primary Examiner* — Daniel Previl
(74) *Attorney, Agent, or Firm* — Gardere Wynne Sewell LLP

(57) ABSTRACT

An improved system and method for creating and accessing a centralized database containing an assorted variety of information related to a debtor such as physical addresses of the debtor or his friends, associates and relatives, as well as information related to a mobile asset, such as physical description information, collectively referred to as "identifying information." Methods are also disclosed for lenders and others to send identifying information to the centralized database, and for users such as skip tracers to be able to download and use the information located in the database for asset recovery purposes.

25 Claims, 3 Drawing Sheets

Related U.S. Application Data

(60) Provisional application No. 61/449,481, filed on Mar. 4, 2011.

(51) Int. Cl.
  *H04W 4/02* (2018.01)
  *G01S 1/04* (2006.01)
  *G06F 17/30* (2006.01)
  *G06Q 50/18* (2012.01)
  *G06Q 40/02* (2012.01)

(52) U.S. Cl.
  CPC ............ *G06Q 40/02* (2013.01); *G06Q 50/18* (2013.01); *H04W 4/025* (2013.01); *G06Q 40/025* (2013.01)

(58) Field of Classification Search
  USPC .... 340/989, 932.2, 933, 937, 942, 905, 995, 340/988, 928, 572.1–572.9
  See application file for complete search history.

(56) References Cited

U.S. PATENT DOCUMENTS

| | | |
|---|---|---|
| 5,081,685 A | 1/1992 | Jones, III et al. |
| 5,315,664 A | 5/1994 | Kumagai |
| 5,381,155 A | 1/1995 | Gerber |
| 5,425,108 A | 6/1995 | Hwang et al. |
| 5,497,430 A | 3/1996 | Sadovnik et al. |
| 5,515,042 A | 5/1996 | Nelson |
| 5,568,406 A | 10/1996 | Gerber |
| 5,638,302 A | 6/1997 | Gerber |
| 5,651,075 A | 7/1997 | Frazier et al. |
| 5,809,161 A | 9/1998 | Auty et al. |
| 6,081,206 A | 6/2000 | Kielland |
| 6,340,935 B1* | 1/2002 | Hall ................. G08G 1/14 340/905 |
| 6,433,706 B1 | 8/2002 | Anderson, III et al. |
| 6,747,687 B1 | 6/2004 | Alves |
| RE38,626 E | 10/2004 | Kielland |
| 6,868,313 B2 | 3/2005 | Koljonen |
| 6,982,654 B2 | 1/2006 | Rau et al. |
| 7,016,518 B2 | 3/2006 | Vernon |
| 7,046,169 B2 | 5/2006 | Bucholz et al. |
| 7,412,078 B2 | 8/2008 | Kim |
| 7,504,965 B1* | 3/2009 | Windover ......... G08G 1/0175 340/933 |
| 7,579,965 B2 | 8/2009 | Bucholz |
| 7,983,835 B2 | 7/2011 | Lagassey |
| 8,725,581 B2 | 5/2014 | Breed et al. |
| 8,781,169 B2 | 7/2014 | Jackson et al. |
| 8,971,582 B2 | 3/2015 | DeHart |
| 2002/0000920 A1 | 1/2002 | Kavner |
| 2002/0097145 A1 | 7/2002 | Tumey et al. |
| 2002/0140579 A1* | 10/2002 | Kavner .............. G07B 15/06 340/988 |
| 2003/0133594 A1 | 7/2003 | Sefton |
| 2004/0024711 A1 | 2/2004 | Camping et al. |
| 2004/0104813 A1 | 6/2004 | Rau et al. |
| 2004/0218785 A1 | 11/2004 | Kim |
| 2005/0073436 A1 | 4/2005 | Negreiro |
| 2005/0084134 A1 | 4/2005 | Toda |
| 2005/0177492 A1 | 8/2005 | Camping |
| 2006/0056658 A1 | 3/2006 | Kavner |
| 2007/0139182 A1* | 6/2007 | O'Connor ........... G08B 27/006 340/521 |
| 2007/0140595 A1 | 6/2007 | Taylor et al. |
| 2010/0157061 A1* | 6/2010 | Katsman ............ G07C 5/008 348/149 |
| 2011/0207476 A1* | 8/2011 | Qahwash ............ B60R 25/00 455/456.2 |
| 2012/0250938 A1 | 10/2012 | DeHart |
| 2012/0258731 A1 | 10/2012 | Smith et al. |
| 2014/0201064 A1 | 7/2014 | Jackson et al. |
| 2014/0201213 A1 | 7/2014 | Jackson et al. |
| 2014/0201266 A1* | 7/2014 | Jackson ............ G08G 1/0175 709/203 |

OTHER PUBLICATIONS

"Delinquent Taxpayer Detector", Texas Comptroller of State Accounts,; Nov. 2005;.
"House Joint Resolution No. 5045 Commending G2Tact!cs, Inc.", Jun. 2006.
"New Technology allows cities to find tax delinquents' cars", Westport-News. com, Mar. 2, 2005.
"No License to Steal", Tech Beat, Spring 2006.
"Parking Spotter", GovTech.com, Jun. 27, 2005, 3 pgs.
"Program Abstracts: Mobile License Plate Reading—Putting a Stop to Auto Theft," Jun. 10, 2004.
"Racal Radio Launch a New Vehicle Number Plate Camera System",; Computergram, May 11, 1994;.
"Your Number May be Up", Computergram, May 11, 1994.
ACPO ANPR Steering Group, "Denying Criminals the Use of the Roads", Mar. 2005.
Amelia Kwok, "Israe implements car license plate recognition system," Dec. 3, 2008.
Andy Bromage, "City adds 2nd scanner to search for tax scofflaws", New; Haven Register, Dec. 16, 2004;.
Anthony Abdalla, "Automated License Plate Recognition Technology in Law Enforcement", Union Institute and University—Student Paper, May 7, 2008.
Appian Technology PLC, "Description and Technical Specification—Talon—Automatic Number Plate Recognition System", Mar. 18, 2003.
Arizona Criminal Justice Commission, "Arizona Auto Theft Study," May 2004.
AutoVu Technologies, AutoVu Technologies Website.
Bruce Schneier, "Automatic License Plate Scanners", Schneier. com, Oct. 7, 2005.
Bule Mat Au, "Tool Helps Seize Cars of Tax Delinquents",; GhanaCommunity.com, Mar. 4, 2005;.
C2Tactics, Inc., "C2Tactics Mobile License Plate REader Detects Stolen Auto in First Demonstration at Highway Speeds", May 3, 2004.
Chris Miles, "Ready for the Streets: Law Enforcement Technologies to Deny the Road to Criminals", National Institute of Justice, Mar. 17, 2006.
Chris Partridge, "Your Number May be up", Computergram, May 13, 1994.
Citysync, Limited, "JET RoadRunner—Rapid Deployment Mobile ANPR system," May 7, 2004.
Civica Software, "RMS Mining/ Crime Mapping Case Study", Apr. 16, 2004.
Cradle Technologies, Inc., "Cradle Technologies—Video Streamer with Automatic License Plate Recognition," Feb. 21, 2004.
David Downs, "Dragnet, Reinvented", Wired, Mar. 2006.
David Farber, "Tax Collector Employs Technology to Snare Deadbeats", CNN, Mar. 11, 2005.
David Patch, "Test Devices to Serve as Snooper Troopers", The Toledo; Blade, Aug. 11, 2004;.
Dolsoft Inc., "Vehicle Identification and Tracking System—VITS Program",; Jan. 9, 2011;.
Dr. Craig Donald, "Using Automated Number Plate Recognition as a Crime Management", Hi-Tech Security Solutions, Aug. 2004.
Elsag Auto-Detector, Jun. 2002.
Elsag Spa, "Eisag and Remington," Sep. 3, 2004.
Extreme CCTV Inc., "Extreme CCTV Announces Contract for Stockholm Traffic Cameras," Apr. 22, 2004.
Extreme CCTV Inc., "Extreme CCTV Releases ALERT Software for; Remote License Plate Readers", Jan. 23, 2004;.
Extreme CCTV Inc., "Extreme CCTV Surveillance Systems—Product Focus: REG, AXIS, Canopy," Mar. 27, 2004.
G2Tactics, "BootFinder 2.0—Mobile License Plate Reading", Jan. 20, 2006.

(56) References Cited

OTHER PUBLICATIONS

G2Tactics, "G2Tactics Products Applied to the Business of Recovery Database Network", Mar. 5, 2006.
G2Tactics, "PlateFinder 2.0—Deny the road to criminals", Jan. 20, 2006.
Hi-Tech Solutions, "SeeCar DLL General & Technical information",; Jan. 5, 2003;.
Hi-Tech Solutions, "SeeCar—LPR Product Line", Jun. 26, 2006.
Ian Morton, "Magic Eye' May Spot Road Toll Cheats", Evening; Standard (London), May 17, 1994;.
Intertraff SRL, "If you deserve to be recognized," Jan. 10, 2002.
J.R. Parker Pavol Federl, "An Approach to License Plate Recogition," Jun. 24, 1999.
Jamey Brown, Alantria Harris, Matthew Noury, Amit Patel, John Rafferty, "License Plate Recognition System—Formal Proposal," Sep. 19, 2002.
Jeff Holtz, "Tax Collector Hits the Road in New Haven", The New York; Times, Sep. 19, 2004;.
Lee J. Nelson, "Evolving Automatic License Plate Identification/ Recoginition Technology," Dec. 23, 2004.
Luke O'Brien, "License Plate Tracking for All", Wired, Jul. 25, 2006.
National Insurance Crime Bureau (NICB), "License Plate Recognition Use Agreement," May 2, 2006.
Neurodynamics, "Automatic Number Plate Recogition V2.7 User; Manual", Mar. 12, 2004;.
New York State Division of Criminal Justice Services, "Operation of License Plate Readers for Law Enforcement Agencies in New York State," Oct. 26, 2006, 22 pgs.
Nigel Waters, "Australian Privacy Foundation—Re: Numberplate recognition technology," Australian Privacy Foundation, Jan. 18, 2004.
NLETS Board of Directors, National Law Enforcement Telecommunication System—Agenda, Oct. 21, 2003.
Pamela Mills Senn, "Picking Out Plates", Officer.com, May 2006.
PIPS Technology, "ALPR Tecl1nology for Access Control and Parking; Applications", 3 pgs, approx. 2005-2006.
PIPS Technology, "Automatic License Plate Recognition, the Silent Partner", 4 pgs, approx. 2005-2006.
PIPS Technology, "Brief for an Automated Site Security, Monitoring and; Access Control System", May 27, 2003;.
PIPS Technology, "P362, Compact ALPR Image Capture System", 2 pgs., approx. 2005-2006.
PIPS Technology, "PAGIS—Police ALPR Graphical Interface System", Oct. 18, 2005.
Professor Dorothy J. Glancy, "Privacy on the Road," Ohio Northern Law Review, 2004.
Remington Elsag, "Ten Good Reasons for Choosing Auto-Detector",; Jun. 23, 2004;.
Ritu Kalra, "If Only Pictures Lied", Forbes, Feb. 28, 2005.
Robert Matthews, "Computer Spy Keeps Eye Out for Terror Cars", The; Sunday Telegrapll, Sep. 12, 1993;.
Roger Clarke, "Person-Location and Person-Tracking: Technologies, Risks and Policy Implications", Information Technology & People, Dec. 13, 2000.
Spy Slog, "ANPR Data Retention Guidance by ACPO (Association of; Chief Police Officers)", SpyBiog.org.uk, Nov. 21, 2005;.
Steve Ranger, "Police road camera network targets criminals", Silicon.com,; Mar. 23, 2005;.
Talon System sales advertising brochure, Racal Recorders Inc., 1993.
Tarron Lively, "Arlington Camera Acts as a Rolling Tax Collector", The Washington Times, May 28, 2004.
Tim McFadden, "Automatice License Plate Recognition Systems Emerge as a Law Enforcement Tool," Office of Law Enforcement Technology Commercialization, Apr. 2005.
U.S. Customs and Border Protection, "Performance and Annual Report—Fiscal Year 2003," 2004.
U.S. Department of Justice, "Evaluability Assessment of License Plate Reader Technology," Jan. 30, 2008.
Vigilant Video, "Presentation of Vigilant Video Car Detector and Vehicle Identification and Tracking System (VITS)", Aug. 2005.
Vigiliant Video, "People Detector Overview", May 15, 2005.
VistaBase, "VistaBase Installation and User Guide", Oct. 10, 2004.
Vladimir Shapiro, Dimo Dimov, Stefan Bonchev, Vesilin Velichkov, Georgi Gluhchev, "Adaptive License Plate Image Extraction," Jun. 23, 2004.

* cited by examiner

METHOD AND SYSTEM FOR LOCATING A MOBILE ASSET

PRIORITY CLAIM

This application is a continuation of U.S. patent application Ser. No. 13/412,379 filed on Mar. 5, 2012, entitled "Method and System for Locating a Mobile Asset," now pending, which is a non-provisional application claiming priority to U.S. Provisional Patent Application No. 61/449,481, filed on Mar. 4, 2011 and entitled "Method and System for Locating a Mobile Asset," the contents of each are hereby incorporated by reference in their entirety.

TECHNICAL FIELD OF THE INVENTION

The present invention relates generally to a method and system for locating a mobile asset by making use of user operated mobile devices that communicate with a database to download identifying information related to the mobile asset, and determine whether a mobile asset is within proximity of a mobile device/user.

BACKGROUND OF THE INVENTION

Currently, an industry exists that is supported by multiple companies, software, databases, and tools known as the "skip tracing" industry. Skip tracing describes the technique wherein one or more individuals use various resources to locate an individual for any number of purposes. Individuals who locate other individuals using such resources are colloquially known as skip tracers; they are quasi-investigators who use communications skills, investigative skills, skip tracing software, public and private databases, and other means to locate an individual.

One particular use of skip tracing is to locate individuals who allegedly owe a debt to a creditor. Often times, a person is being sought because he/she owes money to a creditor and has defaulted on the obligation. These obligations are usually secured by tangible property, assets or collateral which the lender is seeking to recover. For instance, a debtor may purchase a motor vehicle under a loan from a lender, with the lender taking a security interest in the motor vehicle. Should the debtor default by failing to meet the obligations of the loan terms, the lender may seek to recover the motor vehicle to help satisfy the conditions of the loan. Skip tracing may therefore be used to find the person(s), which may or may not be the debtor, who most likely has access to the vehicle or other mobile asset that secures the loan. Upon locating the vehicle or mobile asset, the lender may choose to recover the asset to help satisfy the outstanding debt.

However, while skip tracers rely on information provided by lenders in order to facilitate the tracing of tangible assets in the possession of debtors or their associates, there is currently a lack of a complete system to allow skip tracers to conveniently access information regarding assets or collateral sought to be recovered by various lenders.

SUMMARY OF THE INVENTION

It is therefore a general object of the present invention to provide an improved system and method for a centralized database containing an assorted variety of information related to a debtor such as physical addresses of the debtor or his friends, associates and relatives, as well as information related to a mobile asset, such as physical description information, collectively referred to as "identifying information." It is another object of the present invention to provide methods for lenders and others to send identifying information to the centralized database, and for users such as skip tracers to be able to download and use the information located in the database for asset recovery purposes.

A method and system for locating a mobile asset by making use of user operated mobile devices that communicate with a database to download identifying information related to the mobile asset, and determine whether a mobile asset is within proximity of a mobile device/user comprises the steps of sending identifying information related to the mobile asset to the database. The information is processed by a server which reverse-geocodes physical address information into coordinate information readable by global positioning system (GPS)-enabled devices. The processed information along with other information is sent to mobile devices such as notebook computers or other hand held devices over a network connection.

The mobile devices use the information received from the database to determine whether certain conditions or events occur, and may notify a user of the mobile device that the conditions or events have occurred. The mobile devices receive data alerts containing identifying information related to a mobile asset such as the GPS coordinates of relevant addresses. These GPS coordinates and other related identifying information are then stored in the memory of the mobile device. The mobile device continuously compares the user's present location with the GPS coordinates of relevant addresses downloaded from the database. Upon determining that the mobile device is within a predetermined distance from a mobile asset listed in the memory of the mobile device, the mobile device alerts and directs the user to the specific location of where the mobile asset may be located. The user is also provided with a description of the mobile asset and is directed to visually scan the area for the mobile asset. The mobile device then awaits input from the user indicating whether visual contact with the mobile asset is confirmed. If the user responds that the mobile asset has been visually located, the mobile device then instructs the user on any further action to take.

In one embodiment of the present invention, the mobile asset to be recovered is a motor vehicle. In this embodiment, identifying information regarding the mobile asset may be characteristics such as color, make model, vehicle identification number (VIN) and year of the motor vehicle.

In another embodiment of the present invention, the wireless internet connection is a wifi or a wireless broadband internet connection.

In still another embodiment of the present invention, the identifying information sent to the database may be from a lender or creditor of the debtor. In other embodiments of the present invention, the identifying information sent to the database may be from other public or private databases.

A method related to locating a mobile asset, the method comprising the steps of maintaining a database of a plurality of mobile assets, the database including identifying information, associated information and location information for each mobile asset; maintaining a database of users, each user having a type designation; the identifying information for the mobile asset includes at least one of: a physical description of the mobile asset, a license plate number, a VIN, a name of individuals associated with the Mobile Asset, information identifying a make, model, or color, a photograph of the mobile asset, information identifying a type of the mobile asset such as automobile, boat, plane, trailer, RV, or motorcycle, or other information that facilitates identifying the mobile asset; the associated information related to the mobile asset includes at least one of: lender information, public records information, public safety criminal history information, an identity of an authorized agent, a preauthorized payment amount for verifying the location of the mobile asset, a basis upon which the mobile asset is of interest, a type of action to be performed with respect to the mobile asset, or a financial indicator related to the type of action to be performed with respect to the mobile asset or other previously entered associated information with the mobile asset other than identifying information or location information; the location information includes at least one of: a residence location associated with an owner of the mobile asset, a work location associated with an owner of the mobile asset, a location where the mobile asset has been, or a location of a different mobile asset associated with the mobile asset of interest; establishing a communication between a mobile device and the database; receiving from the mobile device information identifying the current location of the mobile device; comparing the current location of the mobile device to at least one item of location information for at least one mobile asset; and sending to the mobile device at least one item of identifying information and at least one item of location information based on the results of the comparison.

In one embodiment, at least some of the identifying information and at least some of the location information is transmitted to the mobile device for storage.

In a further embodiment, at least some of the associated information is transmitted to the mobile device for storage in addition to identifying and/or location information.

The invention is not limited to any particular mobile device. The mobile device referred to herein may be a smart phone, a tablet computer, a laptop computer or other GPS enabled device capable of wirelessly connecting to the database.

The invention may also maintain information regarding the age of the location information in the database. For example, for location information comprising coordinates of a residence, the age of the information may be the date when the record owner of the mobile asset obtained financing for the mobile asset and provided information regarding their residence address. For location information comprising information extracted from a photograph of the license plate of the mobile asset, the age of the information would be based on the time when the scan occurred. Other information in the database may be time stamped and such time stamp may be used as a criteria within the system.

In one embodiment of the invention, the database receives verification that the mobile asset has been located.

In one embodiment of the invention, the database validates the type of user associated with a particular mobile device and transmits information related to the mobile asset selected based in part on the type of user receiving the information. For example, the user type may indicate that the user is associated with a commercial vehicle recovery service and the database would selectively transmit information regarding mobile assets to be recovered. Alternatively, the user type may be associated with law enforcement and the database would selectively transmit information regarding stolen vehicles. In the case of vehicle recovery service, the database may also transmit information related to the financial terms associated with the recovery of the vehicle to the mobile device.

If the user type is associated with law enforcement, the database may selectively transmit information regarding stolen vehicles or other categories of crime related to national, state or local public safety vehicle hot-lists such as "missing person", "gang/terrorist member", "wanted person", "felony warrant", "sex offender", "stolen license plate" and "protection order".

As referred to hereinabove and throughout, the "present invention" refers to one or more exemplary embodiments of the present invention, which may or may not be claimed, and such references are not intended to limit the language of the claims, or to be used to construe the claims in a limiting manner.

BRIEF DESCRIPTION OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. As used herein, "substantially" is to be construed as a term of approximation.

Figure 1:
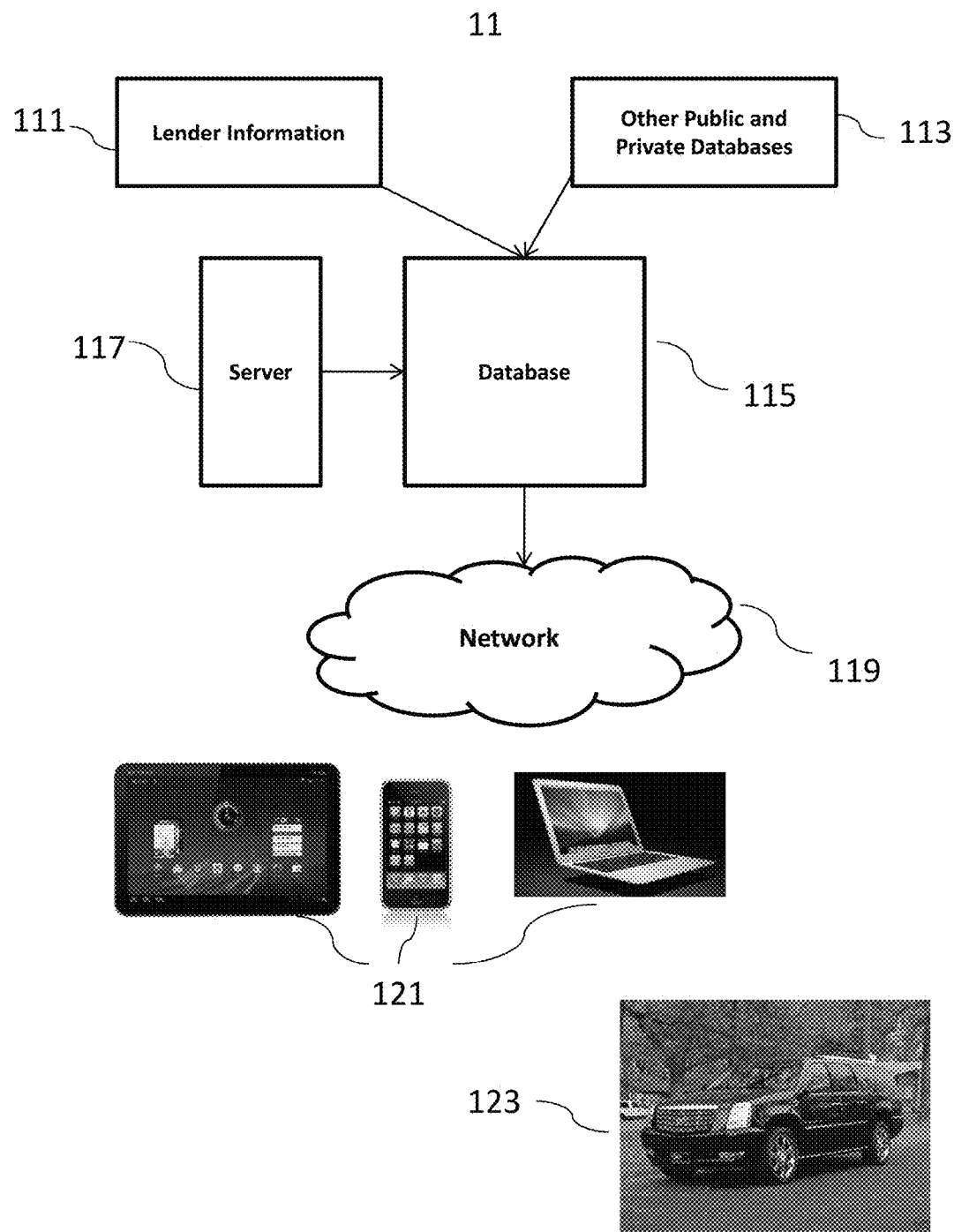
FIG. 1 is a block diagram of a system for locating a Mobile Asset.

FIG. 1 shows a block diagram of a system 11 for locating a Mobile Asset 123. System 11 may comprise a database 115 which stores information related to a debtor or other person associated with the Mobile Asset 123. Information related to the Mobile Asset 123 or related person may be received by database 115 from various sources such as information provided by a lender 111, or from other public or privately available databases 113, such as the internet. In the case of a stolen vehicle, associated persons may be the thief or thieves, if known or other individuals associated with the crime.

Location information supplied to database 115 related to the debtor or record title holder may be physical addresses associated with the debtor and/or the debtor's associates, friends, and relatives, referred to herein as "location information." Location information regarding a thief may include their residence location, if known, the location from which the mobile asset was stolen or the location where the mobile asset was observed after the theft occurred, if any. Location information may also include GPS coordinates associated with a scan of a license plate of the Mobile Asset. Such location information may have a timestamp indicating when the information was received, collected or validated. Location information may also include GPS coordinates or other indicia of location entered into the database from sources other than license plate scans or information about the record title holder or others associated with them.

The identifying information supplied to the database may also include information related to the characteristics of the Mobile Asset 123 itself, such as the make, model, color, and vehicle identification number (VIN) of an automobile. Additional sources of information may be utilized in order to further supply pertinent information regarding a debtor or Mobile Asset 123. Such additional sources of information may be publicly available records or databases such as government records or other information available on the internet. Additionally, private databases may also be utilized in order to gather as much pertinent information related to a debtor or Mobile Asset 123.

Database 115 may also include information regarding a type of user associated with a particular mobile device. For example whether a particular mobile device is associate with law enforcement or asset recovery services may be maintained by Database 115.

Database 115 may also include additional information associated with a particular Mobile Asset such as lender information, an identify of an authorized agent, a preauthorized payment amount for verifying the location of the mobile asset, a basis upon which the mobile asset is of interest, a type of action to be performed with respect to the mobile asset, or a financial indicator related to the type of action to be performed with respect to the mobile asset or other previously entered associated with the mobile asset other than identifying information. The basis upon which the mobile asset is of interest may include that the Mobile Asset is subject to a repossession order or that the Mobile Asset is a stolen vehicle. The financial indicator may be a specific pre-authorized amount that will be paid by a lender upon successful repossession of the Mobile Asset or may be an indicator of which actions must be taken to obtain authorization to recover the Mobile Asset.

Database 115 is communicably coupled to a server 117 which may process information received and stored in database 115. Information processed by server 117 may include location information such as physical address locations which may be reverse geocoded by server 117 in order to obtain coordinate information readable by GPS enabled devices. This coordinate information is sent to database 115 where it is stored. Once database 115 has stored processed information related to Mobile Asset 123, it may send the location information, along with asset or debtor or other identifying information to a number of Mobile Devices 121 through a network 119. The server may also send information regarding the age of the location information to the mobile device.

In a preferred embodiment of the present invention, Mobile Device 121 may be a GPS-enabled cellular phone or smart phone, a notebook or laptop computer with an attached GPS device, or any other portable device with a GPS transceiver and the capability to send or receive information from the network 119. In a preferred embodiment of the present invention, the network 119 used by database 115 for communicating with Mobile Devices 121 is the internet. However, other network types may also be suitably used. For instance, an intranet, or local area network may be used by Mobile Device 121 to communicate and transfer information with database 115.

Using an available GPS transceiver, Mobile Device 121 continuously monitors and compares the present location of Mobile Device 121 with the location information sent by database 115. Alternatively, the Server 117 may compare the location information associated with a particular Mobile Asset with GPS information received from the Mobile Device 121 indicating the Mobile Device 121's current location. Preferably, Mobile Device 121 has an integrated GPS transceiver. If Mobile Device 121 or Server 117 detects correlation with location information associated with an asset within a certain set proximity (e.g., one mile from a known debtor address) during this continuous monitoring and comparing of location information, Mobile Device 121 will alert a user operating Mobile Device 121 by visual, audible or vibratory means. Alternatively, Server 117 may transmit an alert to the mobile device. For a further alternative, Server 117 may transmit to Mobile Device 121 a plurality of records related to Mobile Assets of interest selected for proximity to the current GPS coordinates of the mobile device. Server 117 may, periodically, upon receipt of a request from Mobile Device 121 or based on some other predetermined criteria, transmit a revised plurality of records based on, among other things, an updated set of GPS coordinates for the Mobile Device 121.

Mobile Device 121 may include a software application that performs additional filtering on the records received from Server 117 and provide alerts based on continuously updated proximity between Mobile Device 121 and a set of locations associated with a plurality of Mobile Assets 123. The software running on Mobile Device 121 may apply additional filtering criteria in addition to the current proximity. For example, the software running on Mobile Device 121 may only provide an alert based on proximity to Mobile Asset locations which have an age less than a week. Alerts may be filtered based on any criteria selected by the user.

Either mobile device or Server 117 may process additional information in determining whether to issue an alert. For example, the user type may also be used by Mobile Device 121 or Server 117 to determine whether to issue an alert. For example, a law enforcement user would not be issued an alert if they were close to a Mobile Asset being sought for repossession. Likewise, an asset recovery service would not necessarily be issued an alert when they were close to a stolen vehicle.

The user may then be provided with further information related to Mobile Asset 123 in order to more accurately identify the asset. If the identity of Mobile Asset 123 is confirmed, for example by visual sighting, the user may notify database 115 of a match through an interface on Mobile Device 121. Database 115 may then relay additional information or instructions to user through Mobile Device 121. Alternatively, the identifying information may already have been stored on Mobile Device 121 and may be supplied to the user of the Mobile Device 121 directly.

Figure 2:
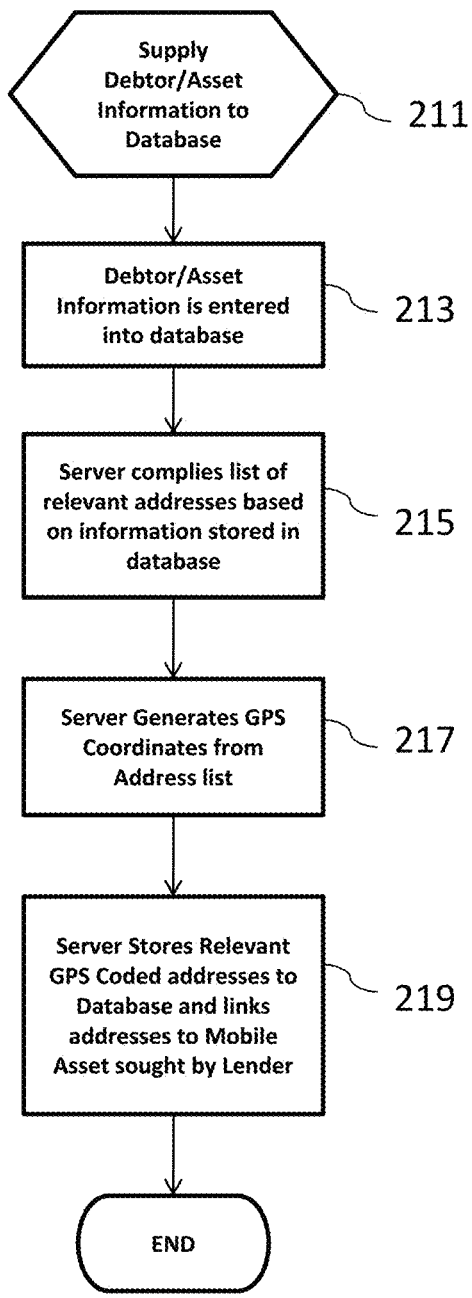
FIG. 2 is a flow chart illustrating a process of entering identifying information into a database, generating relevant GPS coordinates from the information, and storing the GPS coordinates correlated with identifying information.

Turning now to FIG. 2, a flow chart of the methods steps for a preferred embodiment of the present invention is shown. In step 211, identifying information related to a Mobile Asset 123 or associated individual is supplied to a database 115. Generally, a lender will supply this information to database 115, however, persons or parties other than a lender that seek to recover a Mobile Asset 123 may also submit information to the database 115. Mobile Asset 123 may be any type of physical property that may normally move to different locations. Common examples of such mobile assets include motor vehicles such as cars, trucks, motorcycles, bicycles, RVs, trailers and other transportation devices. Other types of mobile assets may include boats, planes, and other items. The information contained in the database includes location information associated with the asset or debtor, as well as other identifying information associated with the asset or debtor.

Once all pertinent and available information related to a Mobile Asset 123 or associated individuals has been supplied to the database, the identifying information is entered and stored in the database at step 213. At step 215, database 115 sends location information, such as physical addresses, to a server 117, and server 117 compiles a list of relevant locations based on the location information stored in the database. Next, at step 217, server 117 reverse-geocodes the location information relevant to a particular debtor or Mobile Asset 123. During the reverse-geocoding process, the location information is translated into specific latitude and longitude coordinates understandable by devices which utilize a global positioning system (GPS). Server 117 then transfers these GPS coordinates back to database 115 for storage at step 219. During this step, the database 115 links the appropriate location information to the identifying information for a particular mobile asset being sought.

Figure 3:
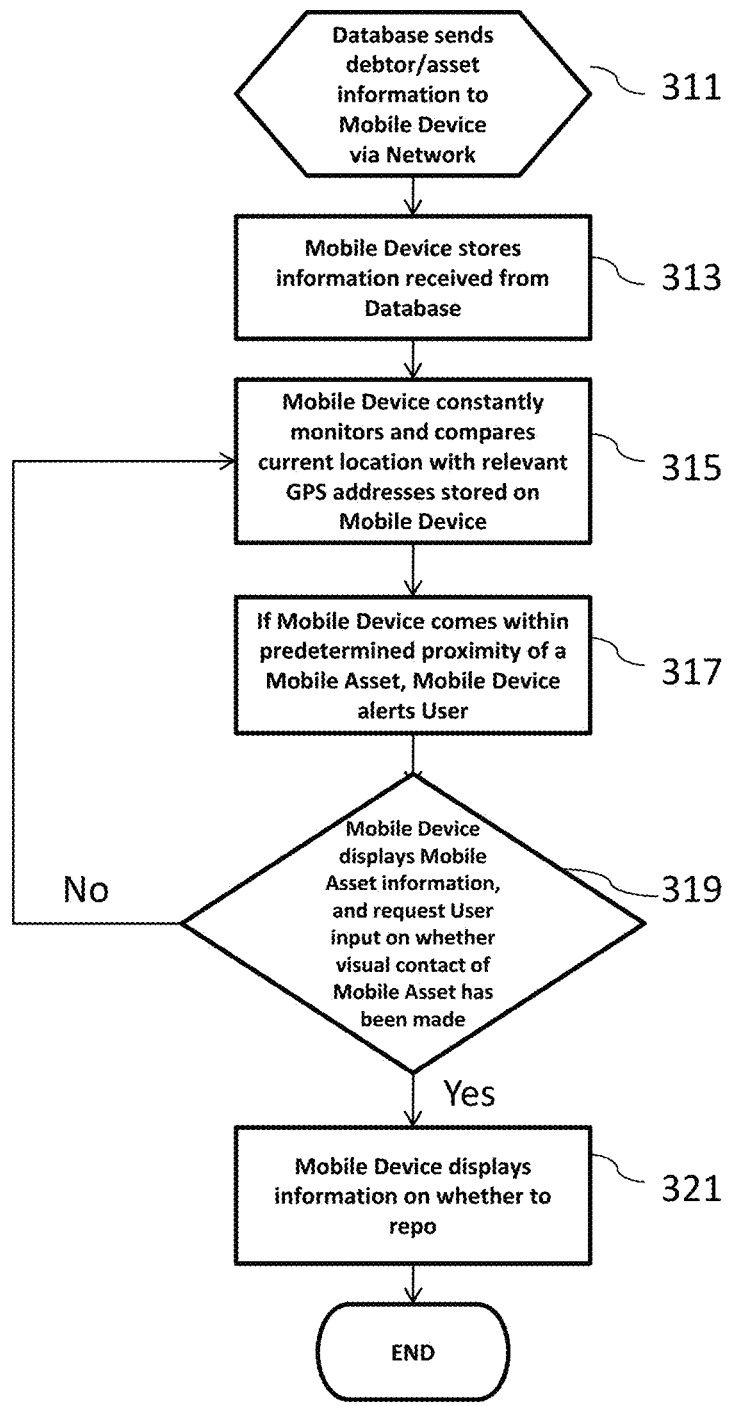
FIG. 3 is a flow chart illustrating a process for a mobile device to receive debtor/mobile asset identifying information from the database, determine proximity of the mobile device with at least one mobile asset, and providing further information for verifying the identity of the mobile asset.

Next, in FIG. 3, database 115 sends identifying information relevant to Mobile Assets 123 that may be located in the region of Mobile Device 121 at step 311. The relevant information is sent to Mobile Device 121 via a network connection. As previously disclosed, Mobile Device 121 may be any electronic device capable of sending and receiving information from the database with GPS functionality. In a preferred embodiment of the present invention, the network used to send information to Mobile Device 121 is a wireless internet connection.

Next, at step 313, Mobile Device 121 receives the information sent from database 115 and stores the information in local memory located on the Mobile Device 121. The received information may be GPS coordinate information. The information may also be asset information related to the Mobile Asset 123 or associated individual. After receiving and storing information related to the debtor or Mobile Asset 123, Mobile Device 121 constantly monitors and compares the current location of Mobile Device 121 with the location information stored in the local memory of Mobile Device 121 at step 315. If Mobile Device 121 determines that it has come within a predetermined proximity of a Mobile Asset listed in its local memory (e.g., one mile of a known debtor address), Mobile Device 121 alerts a user of the Mobile Device of this occurrence at step 317. The alert may contain a message to the user that he/she may be in the vicinity of an asset which is wanted for recovery. Each of the data analysis steps described herein as occurring on the Mobile Device 121 may alternatively be performed on Server 117 and the results transmitted to Mobile Device 121 as they are relevant.

Subsequently, at step 319, Mobile Device 121 displays identifying information related to the Mobile Asset 123. The displayed information may include a description of Mobile Asset 123, an instruction to the user to visually scan the area for Mobile Asset 123, and a request that the user indicate to the Mobile Device 121 whether visual sighting or contact with the Mobile Asset 123 has been confirmed. If the user inputs a response to the Mobile Device 121 that visual contact with Mobile Asset 123 has been confirmed, then at step 321, Mobile Device 121 then displays additional information for the user to either recover Mobile Asset 123 if the user is legally able to do so, or await further instructions. In an embodiment of the present invention, the additional information displayed for the user comprises contact information for the lender or creditor (e.g., lender's name, email address, phone number).

However, if visual contact of Mobile Asset 123 is not confirmed by the user, Mobile Device 121 returns to continuously monitoring and comparing the present location with GPS addresses stored on Mobile Device 121 at step 315.

It will be readily apparent to those skilled in the art that the general principles defined herein may be applied to other embodiments and applications without departing from the spirit and scope of the present invention.

Having thus described the exemplary embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is contemplated that the appended claims will cover any such modifications or embodiments that fall within the true scope of the invention.

The invention claimed is:

1. A method for confirming a location of a mobile asset, comprising:
   providing a database with data entries associated with a plurality of mobile assets and for each mobile asset the data entries comprising identifying data associated with the mobile asset and location data associated with the mobile asset;
   wherein for each mobile asset the identifying data comprises a number of a license plate of the mobile asset, a vehicle identification number of the mobile asset, a make of the mobile asset, a model of the mobile asset, and a model year of the mobile asset;
   wherein for each mobile asset the location data comprises a home address of a possessor of the mobile asset and a work address of the possessor of the mobile asset;
   communicating to a plurality of mobile devices the identifying data and the location data for the plurality of mobile assets;
   communicating a software application to each of the plurality of mobile devices, the software application operable to enable each mobile device to:
      continuously compare the location data associated with each mobile asset to global positioning system ("GPS") coordinates of a current location of the mobile device;
      provide an alert when a result of the comparison is that the current location of the mobile device is within a predetermined distance of one of the data entries of location data associated with one of the mobile assets;
      display at least some of the identifying data of the one mobile asset; and
      transmit a communication confirming or refuting visual contact with a physical mobile asset corresponding to the at least some of the identifying data.

2. The method of claim 1 wherein communication confirms visual contact and further comprising storing in the database an indicator indicating the one mobile asset is located at the location corresponding to the one data entry at a specific time.

3. The method of claim 1 wherein for each mobile asset the identifying data further comprises a scan location associated with a scan of the license plate of the mobile asset.

4. The method of claim 3 wherein the scan location includes a time stamp.

5. The method of claim 1 wherein the identifying data and the location data communicated to the plurality of mobile devices are identifying data and location data associated with a set of mobile assets associated with a predetermined geographic region.

6. The method of claim 1 further comprising reverse geocoding the location data for each mobile asset.

7. The method of claim 1 wherein the communication refutes visual contact and wherein the mobile device is further operable to return to continuously comparing the location data associated with each mobile asset with the GPS coordinates of the current location of the mobile device.

8. The method of claim 1 wherein each of the plurality of mobile devices is a GPS enabled device capable of wireless communication.

9. The method of claim 1 wherein the identifying data and the location data communicated to the plurality of mobile devices are identifying data and location data associated with a set of mobile assets designated by a user type, the user type being commercial vehicle recovery service or law enforcement.

10. The method of claim 9 wherein the user type is commercial vehicle recovery service and the location data and the identifying data are associated with a set of mobile assets to be repossessed.

11. The method of claim 9 wherein the user type is law enforcement and the location data and the identifying data are associated with a set of mobile assets indicated as stolen.

12. The method of claim 1 wherein the identifying data for each mobile asset includes lender contact information.

13. The method of claim 1 wherein the identifying data for each mobile asset includes a photograph of the mobile asset.

14. A method for confirming a location of a mobile asset, comprising:
providing a database with data entries associated with a plurality of mobile assets and for each mobile asset the data entries comprising identifying data associated with the mobile asset and location data associated with the mobile asset;
wherein for each mobile asset the identifying data comprises a number of a license plate of the mobile asset, a vehicle identification number of the mobile asset, a make of the mobile asset, a model of the mobile asset, and a model year of the mobile asset;
wherein for each mobile asset the location data comprises a home address of a possessor of the mobile asset and a work address of the possessor of the mobile asset;
receiving global positioning system ("GPS") coordinates associated with current locations of a plurality of handheld mobile devices;
comparing the GPS coordinates associated with the current locations of the handheld mobile devices to the location data of each mobile asset;
determining that one of the current locations associated with one of the handheld mobile devices is within a predetermined distance of one of the data entries of location data associated with one of the mobile assets;
communicating to the one handheld mobile device at least some of the identifying data associated with the one mobile asset; and
receiving from the one handheld mobile device a communication confirming or refuting visual contact with a physical mobile asset corresponding to the at least some of the identifying data.

15. The method of claim 14, further comprising periodically receiving updated GPS coordinates corresponding to updated handheld mobile device current locations and comparing the updated GPS coordinates to the location data.

16. The method of claim 14 further comprising reverse geocoding the location data into GPS coordinates.

17. The method of claim 14 wherein the communication confirms visual contact and further comprising storing in the database an indicator indicating the one mobile asset is located at the location corresponding to the one data entry at a specific time.

18. The method of claim 14 wherein for each mobile asset the identifying data further comprises a scan location associated with a scan of the license plate of the mobile asset.

19. The method of claim 14 further comprising communicating to the one handheld mobile device at least some of the location data associated with the one mobile asset.

20. A system for confirming a location of a mobile asset, comprising:
a database comprising:
data entries associated with a plurality of mobile assets and for each mobile asset the data entries comprising identifying data associated with the mobile asset and location data associated with the mobile asset;
wherein for each mobile asset the identifying data comprises a number of a license plate of the mobile asset, a vehicle identification number of the mobile asset, a make of the mobile asset, a model of the mobile asset, and a model year of the mobile asset;
wherein for each mobile asset the location data comprises a home address of a possessor of the mobile asset and a work address of the possessor of the mobile asset;
a processor associated with the database, the processor operable to:
receive global positioning system ("GPS") coordinates associated with current locations of a plurality of handheld mobile devices;
compare the GPS coordinates associated with the current locations of the handheld mobile devices to the location data of each mobile asset;
determine that one of the current locations associated with one of the handheld mobile devices is within a predetermined distance of one of the data entries of location data associated with one of the mobile assets;
communicate to the one handheld mobile device at least some of the identifying data associated with the one mobile asset; and
receive from the one handheld mobile device a communication confirming or refuting visual contact with a physical mobile asset corresponding to the at least some of the identifying data.

21. The system of claim 20 wherein the processor is further operable to periodically receive updated GPS coordinates corresponding to updated handheld mobile device current locations and compare the updated GPS coordinates to the location data.

22. The system of claim 20 wherein the processor is further operable to reverse geocode the location data into GPS coordinates.

23. The system of claim 20 wherein the processor receives confirmation of visual contact and the database stores an indicator indicating the one mobile asset is located at the location corresponding to the one data entry at a specific time.

24. A method for confirming a location of a mobile asset, comprising:
- providing a database with data entries associated with a plurality of mobile assets and for each mobile asset the data entries comprising identifying data associated with the mobile asset and location data associated with the mobile asset;
- wherein for each mobile asset the identifying data comprises at least two of the group consisting of: a number of a license plate of the mobile asset, a vehicle identification number of the mobile asset, a make of the mobile asset, a model of the mobile asset, and a model year of the mobile asset;
- wherein for each mobile asset the location data comprises a first address associated with the mobile asset and a second address associated with the mobile asset;
- communicating the location information and the identification information to a plurality of handheld mobile devices, each handheld mobile device operable to: compare GPS coordinates associated with a current location of the handheld mobile device to the location data of the plurality of mobile assets and determine that the current location of the handheld mobile device is within a predetermined distance of one of the data entries of location data associated with one of the mobile assets, and issue an alert; and
- receiving from the handheld mobile device a communication confirming or refuting visual contact with a physical mobile asset corresponding to the at least some of the identifying data at a location corresponding to the one data entry of location data.

25. The method of claim 24 wherein the communication confirms visual contact and further comprising storing in the database an indicator indicating the one mobile asset is located at the location corresponding to the one data entry at a specific time.

* * * * *